United States Patent
Smart (10) Patent No.: US 8,559,998 B2
(45) Date of Patent: Oct. 15, 2013

(54) POWER CONTROL

(75) Inventor: Christopher Brian Smart, Wootton Bassett Wiltshire (GB)

(73) Assignee: Mindspeed Technologies U.K., Limited, Bath (GB)

( * ) Notice: Subject to any disclaimer, the term of this patent is extended or adjusted under 35 U.S.C. 154(b) by 986 days.

(21) Appl. No.: 12/264,531

(22) Filed: Nov. 4, 2008

(65) Prior Publication Data
US 2009/0149211 A1 Jun. 11, 2009

(30) Foreign Application Priority Data

Nov. 5, 2007 (GB) .................................. 0721719.3

(51) Int. Cl.
*H04B 7/00* (2006.01)
*H04W 52/18* (2009.01)

(52) U.S. Cl.
USPC .............. 455/522; 455/69; 455/444; 455/449

(58) Field of Classification Search
USPC ................ 455/444, 449, 446, 522, 69, 67.11, 455/63.1, 501, 452.1, 452.2; 370/328, 338
See application file for complete search history.

(56) References Cited

U.S. PATENT DOCUMENTS

| | | | |
|---|---|---|---|
| 4,380,046 A | 4/1983 | Frosch et al. | |
| 4,574,345 A | 3/1986 | Konesky | |
| 4,589,066 A | 5/1986 | Lam et al. | |
| 4,601,031 A | 7/1986 | Walker et al. | |
| 4,603,404 A | 7/1986 | Yamauchi et al. | |
| 4,622,632 A | 11/1986 | Tanimoto et al. | |
| 4,698,746 A | 10/1987 | Goldstein | |
| 4,720,780 A | 1/1988 | Dolecek | |
| 4,736,291 A | 4/1988 | Jennings et al. | |
| 4,814,970 A | 3/1989 | Barbagelata et al. | |
| 4,825,359 A | 4/1989 | Ohkami et al. | |
| 4,858,233 A | 8/1989 | Dyson et al. | |
| 4,890,279 A | 12/1989 | Lubarsky | |
| 4,914,653 A | 4/1990 | Bishop et al. | |
| 4,937,741 A | 6/1990 | Harper et al. | |
| 4,943,912 A | 7/1990 | Aoyama et al. | |
| 4,967,326 A | 10/1990 | May | |
| 4,974,146 A | 11/1990 | Works et al. | |
| 4,974,190 A | 11/1990 | Curtis | |

(Continued)

FOREIGN PATENT DOCUMENTS

| | | |
|---|---|---|
| CN | 101754351 | 6/2010 |
| CN | 101873688 | 10/2010 |

(Continued)

OTHER PUBLICATIONS

British Search Report dated Feb. 26, 2008 for priority UK Application No. GB0721719.3.

(Continued)

*Primary Examiner* — John J Lee
(74) *Attorney, Agent, or Firm* — Weide & Miller, Ltd.

(57) ABSTRACT

There is provided a femtocell device for use in connecting a mobile terminal to a communication network, the femtocell device comprising means for implementing a power control procedure in which a target value for a first characteristic of transmissions received from the mobile terminal is set and adjusted based on a quality of service criteria for the transmissions; and wherein the means for implementing the power control procedure operates in a physical layer of the femtocell device.

23 Claims, 5 Drawing Sheets

(56) References Cited

U.S. PATENT DOCUMENTS

| | | | |
|---|---|---|---|
| 4,992,933 A | 2/1991 | Taylor |
| 5,036,453 A | 7/1991 | Renner et al. |
| 5,038,386 A | 8/1991 | Li |
| 5,065,308 A | 11/1991 | Evans |
| 5,109,329 A | 4/1992 | Strelioff |
| 5,152,000 A | 9/1992 | Hillis |
| 5,193,175 A | 3/1993 | Cutts et al. |
| 5,233,615 A | 8/1993 | Goetz |
| 5,239,641 A | 8/1993 | Horst |
| 5,241,491 A | 8/1993 | Carlstedt |
| 5,247,694 A | 9/1993 | Dahl |
| 5,253,308 A | 10/1993 | Johnson |
| 5,265,207 A | 11/1993 | Zak et al. |
| 5,280,584 A | 1/1994 | Caesar et al. |
| 5,384,697 A | 1/1995 | Pascucci |
| 5,386,495 A | 1/1995 | Wong et al. |
| 5,408,676 A | 4/1995 | Mori |
| 5,410,723 A | 4/1995 | Schmidt et al. |
| 5,410,727 A | 4/1995 | Jaffe et al. |
| 5,473,731 A | 12/1995 | Seligson |
| 5,555,548 A | 9/1996 | Iwai et al. |
| 5,557,751 A | 9/1996 | Banman et al. |
| 5,570,045 A | 10/1996 | Erdal et al. |
| 5,600,784 A | 2/1997 | Bissett et al. |
| 5,692,139 A | 11/1997 | Slavenburg |
| 5,719,445 A | 2/1998 | McClure |
| 5,734,921 A | 3/1998 | Dapp et al. |
| 5,752,067 A | 5/1998 | Wilkinson et al. |
| 5,761,514 A | 6/1998 | Aizikowits et al. |
| 5,790,879 A | 8/1998 | Wu |
| 5,795,797 A | 8/1998 | Chester et al. |
| 5,796,937 A | 8/1998 | Kizuka |
| 5,802,561 A | 9/1998 | Fava et al. |
| 5,805,839 A | 9/1998 | Singahl |
| 5,826,033 A | 10/1998 | Hayashi et al. |
| 5,826,049 A | 10/1998 | Ogata et al. |
| 5,826,054 A | 10/1998 | Jacobs et al. |
| 5,845,060 A | 12/1998 | Vrba et al. |
| 5,860,008 A | 1/1999 | Bradley |
| 5,861,761 A | 1/1999 | Kean |
| 5,864,706 A | 1/1999 | Kurokawa et al. |
| 5,923,615 A | 7/1999 | Leach et al. |
| 5,926,640 A | 7/1999 | Mason et al. |
| 5,946,484 A | 8/1999 | Brandes |
| 5,951,664 A | 9/1999 | Lambrecht et al. |
| 5,959,995 A | 9/1999 | Wicki et al. |
| 5,963,609 A | 10/1999 | Huang |
| 6,023,757 A | 2/2000 | Nishimoto et al. |
| 6,044,451 A | 3/2000 | Slavenburg |
| 6,052,752 A | 4/2000 | Kwon |
| 6,055,285 A | 4/2000 | Alston |
| 6,069,490 A | 5/2000 | Ochotta et al. |
| 6,101,599 A | 8/2000 | Wright et al. |
| 6,122,677 A | 9/2000 | Porterfield |
| 6,167,502 A | 12/2000 | Pechanek et al. |
| 6,173,386 B1 | 1/2001 | Key et al. |
| 6,175,665 B1 | 1/2001 | Sawada |
| 6,199,093 B1 | 3/2001 | Yokoya |
| 6,317,820 B1 | 11/2001 | Shiell et al. |
| 6,345,046 B1 | 2/2002 | Tanaka |
| 6,360,259 B1 | 3/2002 | Bradley |
| 6,381,293 B1 | 4/2002 | Lee et al. |
| 6,381,461 B1 | 4/2002 | Besson et al. |
| 6,393,026 B1 | 5/2002 | Irwin |
| 6,408,402 B1 | 6/2002 | Norman |
| 6,424,870 B1 | 7/2002 | Maeda et al. |
| 6,448,910 B1 | 9/2002 | Lu |
| 6,499,096 B1 | 12/2002 | Suzuki |
| 6,499,097 B2 | 12/2002 | Tremblay et al. |
| 6,567,417 B2 | 5/2003 | Kalkunte et al. |
| 6,615,339 B1 | 9/2003 | Ito et al. |
| 6,631,439 B2 | 10/2003 | Saulsbury et al. |
| 6,681,341 B1 | 1/2004 | Fredenburg et al. |
| 6,775,766 B2 | 8/2004 | Revilla et al. |
| 6,795,422 B2 | 9/2004 | Ohsuge |
| 6,829,296 B1 | 12/2004 | Troulis et al. |
| 6,892,293 B2 | 5/2005 | Sachs et al. |
| 6,928,500 B1 | 8/2005 | Ramanujan et al. |
| 6,952,181 B2 | 10/2005 | Karr et al. |
| 6,961,782 B1 | 11/2005 | Denneau et al. |
| 6,996,157 B2 | 2/2006 | Ohsuge |
| 7,103,008 B2 | 9/2006 | Greenblat et al. |
| 7,161,978 B2 | 1/2007 | Lu et al. |
| 7,237,055 B1 | 6/2007 | Rupp |
| 7,302,552 B2 | 11/2007 | Guffens et al. |
| 7,340,017 B1 | 3/2008 | Banerjee |
| 7,342,414 B2 | 3/2008 | DeHon |
| 7,383,422 B2 | 6/2008 | Kageyama et al. |
| 7,428,721 B2 | 9/2008 | Rohe et al. |
| 7,549,081 B2 | 6/2009 | Robbins et al. |
| 7,672,836 B2 | 3/2010 | Lee et al. |
| 7,712,067 B1 | 5/2010 | Fung et al. |
| 7,801,029 B2 | 9/2010 | Wrenn et al. |
| 7,804,719 B1 | 9/2010 | Chirania et al. |
| 8,032,142 B2 * | 10/2011 | Carter et al. .................. 455/444 |
| 2002/0045433 A1 | 4/2002 | Vihriala |
| 2002/0069345 A1 | 6/2002 | Mohamed et al. |
| 2002/0174318 A1 | 11/2002 | Stuttard et al. |
| 2002/0198606 A1 | 12/2002 | Satou |
| 2003/0154358 A1 | 8/2003 | Seong |
| 2003/0235241 A1 | 12/2003 | Tamura |
| 2004/0078548 A1 | 4/2004 | Claydon et al. |
| 2004/0083409 A1 | 4/2004 | Rozenblit et al. |
| 2004/0139466 A1 | 7/2004 | Sharma et al. |
| 2004/0150422 A1 | 8/2004 | Wong |
| 2004/0198386 A1 | 10/2004 | Dupray |
| 2005/0083840 A1 | 4/2005 | Wilson |
| 2005/0114565 A1 | 5/2005 | Gonzalez et al. |
| 2005/0124344 A1 | 6/2005 | Laroia et al. |
| 2005/0163248 A1 | 7/2005 | Berangi et al. |
| 2005/0250502 A1 | 11/2005 | Laroia et al. |
| 2005/0282500 A1 | 12/2005 | Wang et al. |
| 2006/0087323 A1 | 4/2006 | Furse et al. |
| 2006/0089154 A1 | 4/2006 | Laroia et al. |
| 2006/0251046 A1 | 11/2006 | Fujiwara |
| 2006/0268962 A1 | 11/2006 | Cairns et al. |
| 2007/0036251 A1 | 2/2007 | Jelonnek et al. |
| 2007/0127556 A1 | 6/2007 | Sato |
| 2007/0173255 A1 | 7/2007 | Tebbit et al. |
| 2007/0183427 A1 | 8/2007 | Nylander et al. |
| 2007/0220522 A1 | 9/2007 | Coene et al. |
| 2007/0220586 A1 | 9/2007 | Salazar |
| 2007/0248191 A1 | 10/2007 | Pettersson |
| 2007/0254620 A1 * | 11/2007 | Lindqvist et al. ............. 455/403 |
| 2007/0263544 A1 | 11/2007 | Yamanaka et al. |
| 2007/0270151 A1 * | 11/2007 | Claussen et al. ............. 455/444 |
| 2008/0146154 A1 | 6/2008 | Claussen et al. |
| 2008/0151832 A1 | 6/2008 | Iwasaki |
| 2009/0003263 A1 | 1/2009 | Foster et al. |
| 2009/0042593 A1 | 2/2009 | Yavuz et al. |
| 2009/0046665 A1 | 2/2009 | Robson et al. |
| 2009/0080550 A1 | 3/2009 | Kushioka |
| 2009/0092122 A1 | 4/2009 | Czaja et al. |
| 2009/0097452 A1 | 4/2009 | Gogic |
| 2009/0098871 A1 | 4/2009 | Gogic |
| 2009/0111503 A1 | 4/2009 | Pedersen et al. |
| 2009/0150420 A1 | 6/2009 | Towner |
| 2009/0163216 A1 | 6/2009 | Hoang et al. |
| 2009/0168907 A1 | 7/2009 | Mohanty et al. |
| 2009/0196253 A1 | 8/2009 | Semper |
| 2009/0215390 A1 | 8/2009 | Ku et al. |
| 2009/0252200 A1 | 10/2009 | Dohler et al. |
| 2009/0264077 A1 | 10/2009 | Damnjanovic |
| 2009/0296635 A1 | 12/2009 | Hui et al. |
| 2010/0035556 A1 | 2/2010 | Cai et al. |
| 2010/0046455 A1 | 2/2010 | Wentink et al. |
| 2010/0054237 A1 | 3/2010 | Han et al. |
| 2010/0087148 A1 | 4/2010 | Srinivasan et al. |
| 2010/0105345 A1 | 4/2010 | Thampi et al. |
| 2010/0111070 A1 | 5/2010 | Hsu |
| 2010/0157906 A1 | 6/2010 | Yang et al. |
| 2010/0195525 A1 | 8/2010 | Eerolainen |
| 2010/0215032 A1 | 8/2010 | Jalloul et al. |
| 2010/0216403 A1 | 8/2010 | Harrang |

(56) References Cited

U.S. PATENT DOCUMENTS

| | | |
|---|---|---|
| 2010/0216485 A1 | 8/2010 | Hoole |
| 2010/0222068 A1 | 9/2010 | Gaal et al. |
| 2010/0234061 A1 | 9/2010 | Khandekar et al. |
| 2010/0248646 A1 | 9/2010 | Yamazaki et al. |
| 2010/0273481 A1 | 10/2010 | Meshkati et al. |
| 2010/0279689 A1 | 11/2010 | Tinnakornsrisuphap et al. |
| 2011/0002426 A1 | 1/2011 | Muirhead |
| 2011/0122834 A1 | 5/2011 | Walker et al. |
| 2011/0130143 A1 | 6/2011 | Mori et al. |
| 2011/0170494 A1 | 7/2011 | Kim et al. |

FOREIGN PATENT DOCUMENTS

| | | |
|---|---|---|
| EP | 0 180 212 A3 | 5/1986 |
| EP | 492174 A3 | 7/1992 |
| EP | 0 877 533 A3 | 11/1998 |
| EP | 0 973 099 | 1/2000 |
| EP | 0 977 355 | 2/2000 |
| EP | 1054523 | 11/2000 |
| EP | 1 134 908 | 9/2001 |
| EP | 1418776 | 5/2004 |
| EP | 1876854 | 9/2008 |
| EP | 2 071 738 | 6/2009 |
| EP | 2 326 118 | 5/2011 |
| GB | 2 304 495 | 3/1997 |
| GB | 2 370 380 | 6/2002 |
| GB | 2398651 | 8/2004 |
| GB | 2 414 896 | 12/2005 |
| GB | 2391083 | 3/2006 |
| GB | 2 447 439 | 9/2008 |
| GB | 2463074 | 3/2010 |
| JP | 61123968 | 6/1986 |
| JP | A-8-297652 | 11/1996 |
| JP | 11272645 | 10/1999 |
| JP | 2001-034471 | 2/2001 |
| JP | 2004-525439 | 8/2004 |
| JP | 2006-500673 | 1/2006 |
| WO | 90/04235 | 4/1990 |
| WO | 91/11770 | 8/1991 |
| WO | 97/26593 | 7/1997 |
| WO | 98/50854 | 11/1998 |
| WO | 01/02960 | 1/2001 |
| WO | 02/50624 | 6/2002 |
| WO | 02/50700 | 6/2002 |
| WO | 03/001697 | 1/2003 |
| WO | 2004/029796 A3 | 4/2004 |
| WO | 2004/034251 | 4/2004 |
| WO | 2004/102989 | 11/2004 |
| WO | 2005-048491 A1 | 5/2005 |
| WO | 2006-059172 A1 | 6/2006 |
| WO | 2007/021139 | 2/2007 |
| WO | 2007/054127 | 5/2007 |
| WO | 2007/056733 | 5/2007 |
| WO | 2007-126351 A1 | 11/2007 |
| WO | 2008/030934 | 3/2008 |
| WO | 2008/090154 | 7/2008 |
| WO | 2008/099340 | 8/2008 |
| WO | 2008/155732 | 12/2008 |
| WO | 2009/054205 | 4/2009 |
| WO | 2010/072127 | 7/2010 |
| WO | 2010/126155 | 11/2010 |

OTHER PUBLICATIONS

"Details on specification aspects for UL ICIC", Qualcomm Europe, May 5-9, 2008, 2 pages.

3GPP TS 36.331 v9.2.0 3rd Generation Partnership Project: Technical Specification Group Radio Access Network; Evolved Universal Terrestrial Radio Acces (E-UTRA); Radio Resource Control (RRC) Protocol specification (Release 9) Mar. 2010, pp. 1-248.

Alcatel-Lucent, et al., "Congested H(e)NB Hybrid Access Mode cell", 2009, 3GPP Draft; R3-091053-Congested H(e)NB, $3^{RD}$ Generation Partnership Project (3GPP), Apr. 29, 2009, 4 pages.

Motorola, "Text proposal for TR 36.9xx: Reducing HeNB interference by dynamically changing HeNB access mode", 2009, 3GPP Draft: R4-094688, Apr. 29, 2009, 2 pages.

MIPS, MIPS32 Architecture for Programmers, 2001, MIPS Technologies, vol. 2, pp. 1-253.

Pechanek, et al. ManArray Processor Interconnection Network: An Introduction, Euro-Par'99, LNCS 1685, pp. 761-765, 1999.

Waddington, T., Decompilation of "hello world" on Pentium and SPARC, 4 pages, [retrieved on Aug. 3, 2012]. Retrieved from the Internet:<URL: http://web.archive.org/web/20050311141936/ http://boomerang.sourceforge.net/helloworld.html>.

Balakrishnan, et al., CodeSurfer/x86—A Platform for Analyzing x86 Executables, Springer-Verlag Berlin Heidelber, 2005, [retrieved on Dec. 30, 2011], retrieved from the internet:<URL:http://www.springerlink.com/content/uneu2a95u9nvb20v/>.

Miecznikowski, J., et al., "Decompiling Java Using Stage Encapsulation", Proceedings of the Eighth Working Conference on Reverse Engineering, Oct. 2-5, 2001.

Panesar, G. et al., "Deterministic Parallel Processing", Proceedings of the 1st Microgrid Workshop, Jul. 2005.

Towner, D. et al., "Debugging and Verification of Parallel Systems—the picoChip way", 2004.

picoChip, "PC7203 Development Platform Preliminary Product Brief", Jul. 2007.

Ennals, R. et al., "Task Partitioning for Multi-core Network Processors", 2005.

Rabideau, Daniel J., et al., "Simulated Annealing for Mapping DSP Algorithms on to Multiprocessors," Signals, Systems and Computers, 1993 Conference Record of the Twenty-Seventh Asilomar Conference, Nov. 1-3, 1993, IEEE, pp. 668-672.

Nanda, Ashwini K., et al., "Mapping Applications onto a Cache Coherent Multiprocessor," Conference on High Performance Networking and Computing, Proceedings of the 1992 ACM/IEEE Conference on Supercomputing, 1992, IEEE, pp. 368-377.

Lin, Lian-Yu, et al., Communication-driven Task Binding for Multiprocessor with Latency Insensitive Network-on-Chip, Design Automation Conference, 2005 Proceedings of th ASP-DAC, Jan. 18/21, 2005, IEEE, pp. 39-44.

Holger Claussen, Bell Laboratories, Alcatel-Lucent; "Performance of Macro and Co-Channel Femtocells in a Hierarchical Cell Structure"; The 18th Annual IEEE Internation Symposium on Personal, Indoor and Mobile Radio Communications (PIMRC'07); Sep. 1, 2007; pp. 1-5, XP031168593, ISBN: 978-1-4244-1143-6; Swindon, United Kingdom.

Shiroshita, T., et al.: "Reliable data distribution middleware for large-scale massive data replication" Parallel and Distributed Information Systems, 1993, Fourth International Conference on Miami Beach, FL, USA Dec. 18-20, 1996, Los Alamitos, CA, USA IEEE Comput. Soc, US, Dec. 18, 1996, pp. 196-205m XP010213188 ISBN: 0-8186-7475-X.

Levine B. N. et al.: "A comparison of known classes of reliable multicast protocols" Netowrk Protocols, 1996 International Conference on Columbus, OH, USA Oct. 29-Nov. 1, 1996, Los Alamitos, CA, USA IEEE Comput. Soc. US Oct. 29, 1996, pp. 112-121, XP010204425 ISBN: 0-8186-7453-9.

Ishijima, et al., A Semi-Synchronous Circuit Design Method by Clock Tree Modification IEEE Trans. Fundamentals, vol. E85-A, No. 12 Dec. 2002.

Greenstreet, et al., Implementing a STARI Chip, IEEE 1995.

Hierarchical multiprocessor organizations; J. Archer Harris; David R. Smith; International Symposium on computer Architecture; Proceedings of the 4th annual symposium on Computer architecture pp. 41-48 Year of Publication 1977.

"Hierarchical Interconnection Networks for Multicomputer systems" Sivarama P. Dandamudi, et al. IEEE Transactions on Computers archive vol. 39, Issue 6 (Jun. 1990 ) pp. 786-797 Year of Publication: 1990.

A Cluster Structure as an Interconnection Network for Large Multimicrocomputer Systems Wu, S.B. Liu, M.T. This paper appears in: Transactions on Computers Publication Date: Apr. 1981 vol. C-30, Issue: 4 on pp. 254-264.

(56) References Cited

OTHER PUBLICATIONS

Performance Analysis of Multilevel Bus Networks for Hierarchichal Multiprocessors S.M. Mahmud IEEE Transactions on Computers archive vol. 43, Issue 7 (Jul. 1994) pp. 789-805 Year of Publication: 1994.

Performance Analysis of a Generalized Class of M-Level Hierarchical Multiprocessor Systems I.O. Mahgoub A.K. Elmagarmid Mar. 1992 (vol. 3, No. 2) pp. 129-138.

Kober, Rudolf, "The Multiprocessor System SMS 201—Combining 128 Microprocessors to a Powerful Computer," Sep. 1977, Compcon '77, pp. 225-230.

Knight, Thomas and Wu, Henry, "A Method for Skew-free Distribution of Digital Signals using Matched Variable Delay Lines," VLSI Circuits, 1993. Digest of Technicial Papers. 1993 Symposium on, May 1993, pp. 19-21.

Popli, S.P., et al., "A Reconfigurable VLSI Array for Reliability and Yield Enhancement," Proceedings of the International Conference on Systolic Arrays, 1988, pp. 631-642.

John, L.K., et al., "A Dynamically Reconfigurable Interconnect for Array Processors," IEE Transactions on Very Large Scale Integration (IVsi) Systems, vol. 6, No. 1, Mar. 1998, pp. 150-157.

Schmidt, U., et al., "Datawave: A Single-Chip Multiprocessor for Video Applications," IEEE Micro, vol. 11, No. 3, Jun. 1991, pp. 22-25, 88-94.

Chean, M., et al., "A Taxonomy of Reconfiguration Techniques for Fault-Tolerant Processor Arrays," Computer, IEEE Computer Society, vol. 23, No. 1, Jan. 1990, pp. 55-69.

Kamiura, N., et al., "A Repairable and Diagnosable Cellular Array on Multiple-Valued Logic," Proceedings of the 23rd International Symposium on Multiple-Valued Logic, 1993, pp. 92-97.

LaForge, 1., "Externally Fault Tolerant Arrays," Proceedings: International Conference on Wafer Scale Integration, 1989, pp. 365-378.

Reiner Hartenstein, et al., On Reconfigurable Co-Processing Units, Proceedings of Reconfigurable Architectures Workshop (RAW98), Mar. 30, 1998.

Schmidt, U., et al., "Data-Driven Array Processor for Video Signal Processing", IEEE—1990 (USA).

Muhammad Ali Mazidi, "The80×86 IBM PC and Compatible Computers", 2003, Prentice Hall, 4th edition, pp. 513-515.

Shigei, N., et al., "On Efficient Spare Arrangements and an Algorithm with Relocating Spares for Reconfiguring Processor Arrays," IEICE Transactions on Fundamentals of Electronics, communications and Computer Sciences, vol. E80-A, No. 6, Jun. 1997, pp. 988-995.

"Interference Management in Femto Cell Deployment", Mingxi Fan, Mehmet Yavuz, Sanjiv Nanda, Yeliz Tokgoz, Farhad Meshkati, Raul Dangui, Qualcomm Incorporated, Qualcomm 3GPP2 Femto Workshop, Boston, MA, Oct. 15, 2007.

\* cited by examiner

POWER CONTROL

This application claims the benefit of priority application 0721719.3 filed in the United Kingdom on Nov. 5, 2007. The subject matter of this application is incorporated herein by reference.

TECHNICAL FIELD OF THE INVENTION

The invention relates to power control in a communications network, and in particular to power control for devices using a femtocell device in a communications network.

BACKGROUND TO THE INVENTION

Figure 1:
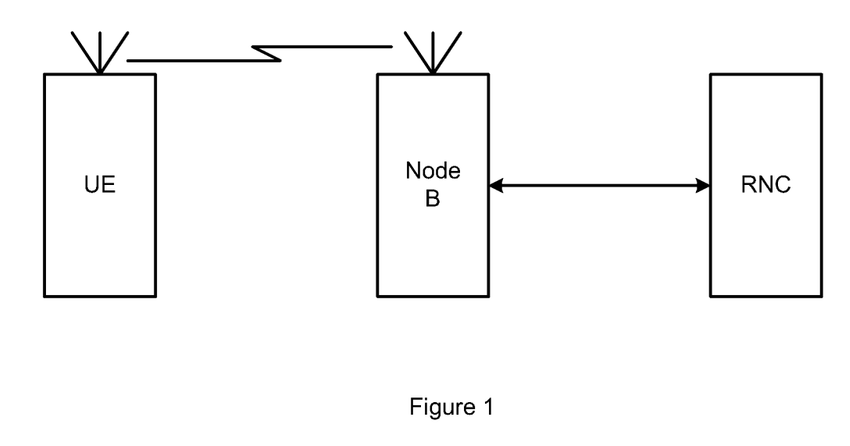
FIG. 1 is a diagram of a conventional WCDMA communication network.

In a traditional Wideband Code Division Multiple Access (WCDMA) communications network, a mobile terminal (known as a user equipment—UE) communicates wirelessly with a local base station (known as a Node B), which itself is connected to a radio network controller (RNC) that is responsible for the control of the Node Bs and that carries out radio resource management. An exemplary system is shown in FIG. 1.

One of the functions carried out by the radio network controller (RNC) is the control of the quality of the communications to and from the user equipment (UE). In particular, the respective transmission powers of the user equipment and Node B are adjusted to meet some predetermined or adjustable target value.

Uplink inner loop power control (which is also known as fast closed loop power control) is the process by which a user equipment can dynamically adjust its transmission power to an appropriate level. The Node B will measure a signal-to-interference ratio (SIR) from the signal received from the user equipment and compare this to a desired SIR value. The Node B will generate a control signal based on this comparison and transmit the signal to the user equipment. The user equipment will then adjust its transmission power in accordance with the received control signal.

Uplink outer loop power control is the process by which the radio network controller sets the desired signal-to-interference ratio for each Node B in the network. The radio network controller is aiming to maintain the quality of the communication link between the user equipment and Node B (namely a Frame Error Rate—FER), while minimising the transmission power used.

A recent development for WCDMA (and other) networks is the introduction of femtocell devices. Femtocell devices combine the elements of a Node B and radio network controller into a single device that is connected to an intranet or the Internet via an Ethernet or a broadband connection. Femtocell devices can be placed in homes or businesses and provide voice and data services to a user equipment in the same way as a normal Node B. However, femtocell devices provide enhanced coverage and capacity beyond what is normally available in such environments from the overlaying macro-cellular network.

One consequence of the reduced infrastructure is that a femtocell device is assumed not to operate in a soft handover mode (in which a user equipment can be simultaneously connected to two or more cells during a call). Any calls (whether voice or data) that are routed through the femtocell device will comprise only a single Radio Link, with no requirement for macro diversity splitting or combining in a Selector Distributer Unit (SDU) at the radio network controller.

SUMMARY OF THE INVENTION

In a femtocell device, it is still necessary to implement transmission power control in order to ensure that the transmissions satisfy a required quality of service without adversely affecting other local transmissions.

There is therefore provided a femtocell device for use in connecting a mobile terminal to a communication network, the femtocell device comprising means for implementing a power control procedure in which a target value for a first characteristic of transmissions received from the mobile terminal is set and adjusted based on a quality of service criteria for the transmissions; and wherein the means for implementing the power control procedure operates in a physical layer of the femtocell device.

According to a second aspect of the invention, there is provided a power control procedure for use in a femtocell device, the femtocell device being used to connect a mobile terminal to a communication network, the procedure comprising, in a physical layer of the femtocell device, setting and adjusting a target value for a first characteristic of transmissions received from the mobile terminal based on a quality of service criteria for the transmissions.

BRIEF DESCRIPTION OF THE DRAWINGS

The invention will now be described, by way of example only, with reference to the following drawings, in which.

DETAILED DESCRIPTION OF THE PREFERRED EMBODIMENTS

Although the invention will be described with reference to a femtocell device for a WCDMA communications network, it will be appreciated that the invention is applicable to any type of second, third or subsequent generation cellular communication network in which there is a power control loop for adjusting the transmission power of the devices in the system. For example, one other particular type of network that the invention is applicable to is a Time Division Synchronous Code Division Multiple Access (TD-SCDMA) network. In other types of network, femtocell devices are known as home base stations, access point base stations or 3G access points.

Figure 2:
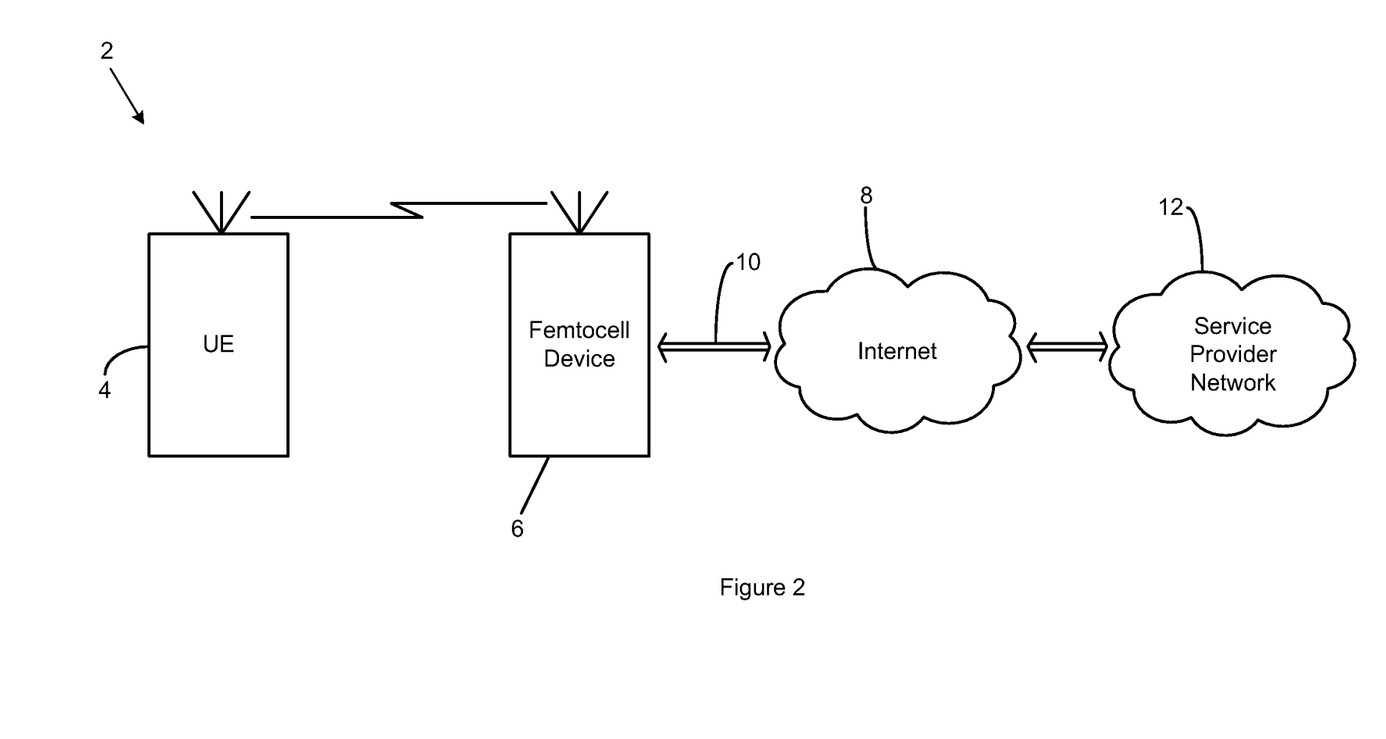
FIG. 2 is a diagram of a femtocell device in a WCDMA communication network in accordance with the invention.

FIG. 2 shows a network 2 in accordance with the invention. The network 2 comprises a mobile terminal (referred to below as user equipment) 4 that can communicate wirelessly with a femtocell device 6. The femtocell device 6 is connected to the Internet 8 via a broadband or similar type connection 10, which it uses to access the service provider network 12.

Although a single user equipment 4 is shown in FIG. 2, it will be appreciated that a femtocell device 6 can typically handle communications with several user equipments 4 at any given time.

As described above, any calls (whether voice or data) that are routed through the femtocell device 6 will comprise only a single Radio Link, with no requirement for macro diversity splitting or combining in a Selector Distributer Unit (SDU) at a radio network controller. As a result, and in accordance with an aspect of the invention, functionality normally resident at a layer above the SDU is repartitioned within the femtocell device 6.

In particular, the outer loop power control procedure normally operates between the radio network controller and the Node B. In a conventional network architecture, the uplink outer loop power control will be part of the Radio Resource Control (RRC) layer in the radio network controller. However, in accordance with an aspect of the invention, a femtocell device 6 can incorporate this functionality in the physical (PHY) layer, which allows the procedure to use additional uplink measurements that are not available to the RRC layer in a conventional system. The inner loop power control procedure, which is conventionally part of the physical layer, remains a part of the physical layer in the femtocell device 6 in accordance with the invention.

Figure 3:
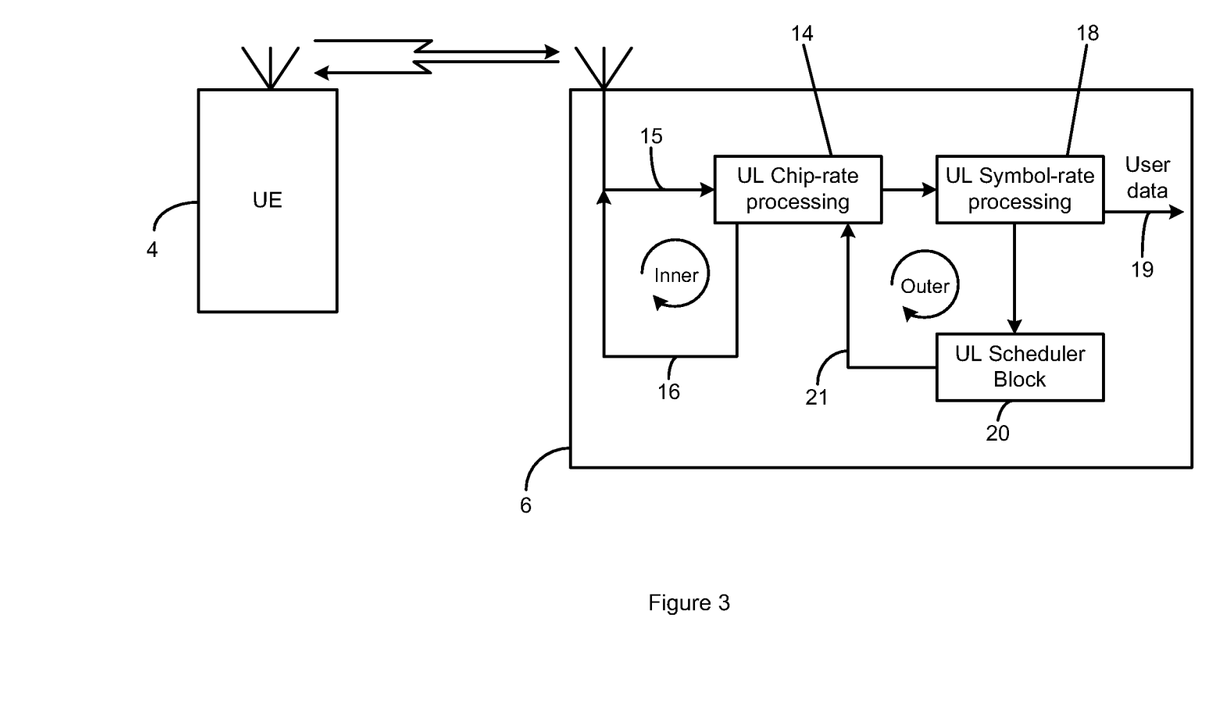
FIG. 3 is a block diagram of a femtocell device in accordance with an aspect of the invention.

An exemplary femtocell device architecture is shown in FIG. 3.

In this Figure, only the components of the femtocell device 6 that handle the uplink (UL) data transmissions from the user equipment 4 are shown, and it will be appreciated that an actual femtocell device 6 will also include components for handling the downlink (DL) data transmissions to the user equipment 4, as well as other components necessary for the functioning of the femtocell device 6.

The femtocell device 6 includes an uplink chip-rate processing block 14 that receives the data transmissions from the user equipment 4 (indicated by arrow 15), compares a first characteristic of the received transmissions with a desired or target value for the first characteristic to determine a power control signal, and which transmits the power control signal back to the user equipment 4 (indicated by arrow 16).

These transmissions 15, 16 and processing block 14 form an inner loop power control, and this operates in a conventional manner. In particular, if the first characteristic exceeds the desired or target value, the user equipment will be instructed to reduce the power of its transmissions, otherwise it will be instructed to increase transmission power.

In a WCDMA network, the first characteristic of the received transmissions is a signal-to-interference ratio (SIR), and this can be measured from the received signal in any suitable manner. Furthermore, the power control signal transmitted to the user equipment 4 is a Transmit Power Control (TPC) command.

The chip-rate processing block 14 also outputs the data transmission to an uplink symbol-rate processing block 18, which processes the transmission to extract the user data 19. The symbol-rate processing block 18 also measures one or more quality of service parameters from the uplink signal, and passes these measurements to an uplink scheduler block 20.

The uplink scheduler block 20 compares the measurements of the one or more quality of service parameters to predetermined quality of service criteria to determine if the transmission is satisfactory. Based on the result of this comparison, the target value of the first characteristic is determined and provided to the chip-rate processing block 14 for use in the power control inner loop, as indicated by arrow 21. The loop formed by the symbol-rate processing block 18, scheduler block 20 and chip-rate processing block 14 is the outer loop power control.

The uplink scheduler block 20 sets the defined or target value of the first characteristic so that the quality of service (QoS) for the user equipment 4 is maintained at or about a required level (i.e. the quality of service should not be allowed to become too high or too low). If the quality of service is allowed to exceed the appropriate level for a particular user equipment, the capacity in the network may be compromised.

In a WCDMA network, the scheduler block 20 sets and adjusts the signal-to-interference ratio to maintain a satisfactory Frame Error Rate (FER) level. The symbol-rate processing block 18 can determine measurements of quality of service parameters such as cyclic redundancy check (CRC) pass/fail indications, and possibly a transport channel bit error rate (TrCH BER) estimate, that are used by the scheduler block 20 to determine the desired SIR value.

In one embodiment, the scheduler block 20 uses a "saw-tooth" algorithm to determine the target SIR value from the cyclic redundancy check pass/fail indications and the transport channel bit error rate estimates output by the symbol-rate processing block 18. The operation of the "saw-tooth" algorithm is as follows: if the CRC indication is a "pass", then the SIR target is decreased by a small amount ($\Delta$down); if the CRC indication is a "fail", then the SIR target is increased by a small amount ($\Delta$up).

However, $\Delta$up is set to be N times larger than $\Delta$down, which means that under steady state conditions the proportion of CRC "fails" to "passes" should be 1:N, which corresponds to a Frame Error Rate (FER) of 1/N. The FER can be controlled by selecting appropriate values for $\Delta$up and $\Delta$down. A more complex version of the saw-tooth algorithm takes the transport channel BER into account when calculating the values for $\Delta$up and $\Delta$down.

As described above, in a conventional system, power control functionality is provided in a radio network controller, with the desired SIR value being signalled to a Node B via Frame Protocol (FP) control frames. However, as the femtocell device 6 determines the desired value for the first characteristic in the physical (PHY) layer, no outer loop power control (OLPC) FP control frames are required.

With the outer loop power control relocated to the physical layer in the femtocell device 6, the same class of algorithms can be used by the uplink scheduler block 20 to determine the target SIR. However, additional measurements of the uplink between the user equipment 4 and femtocell device 6 are available to the scheduler block 20.

For example, the scheduler block 20 may obtain bit error rate (BER) estimates for all transport channels in the connection to the user equipment 4, not just the single transport channel identified by the Quality Estimate (QE) Selector parameters. In addition, a signal-to-interference ratio can be measured on the uplink physical channel (PhyCH).

The outer loop power control algorithm can use these additional measurements to modify or refine the desired value for the first characteristic in such a way as to minimise the uplink transmission power required to meet the quality of service level.

Figure 4A:
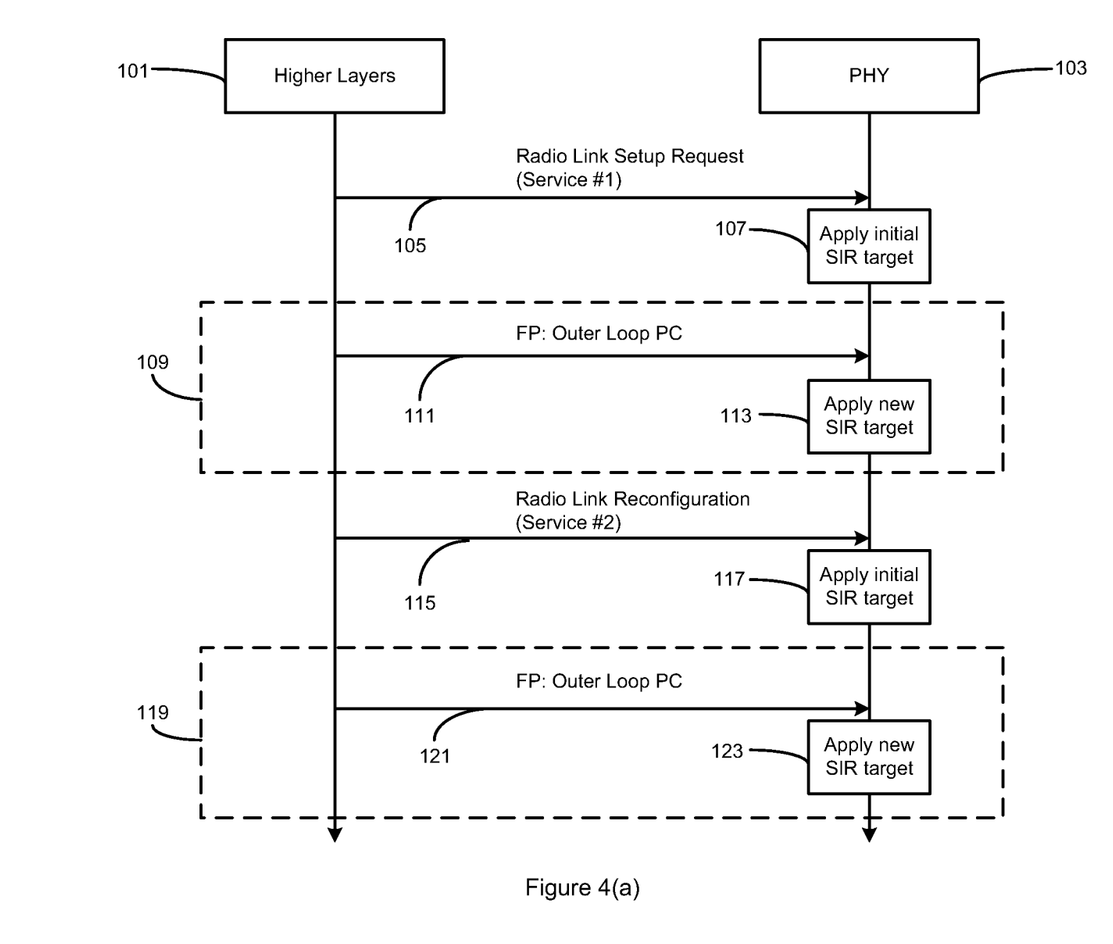
FIGS. 4(a) and 4(b) show signalling diagrams for a conventional procedure and a procedure in accordance with the invention.
Figure 4B:
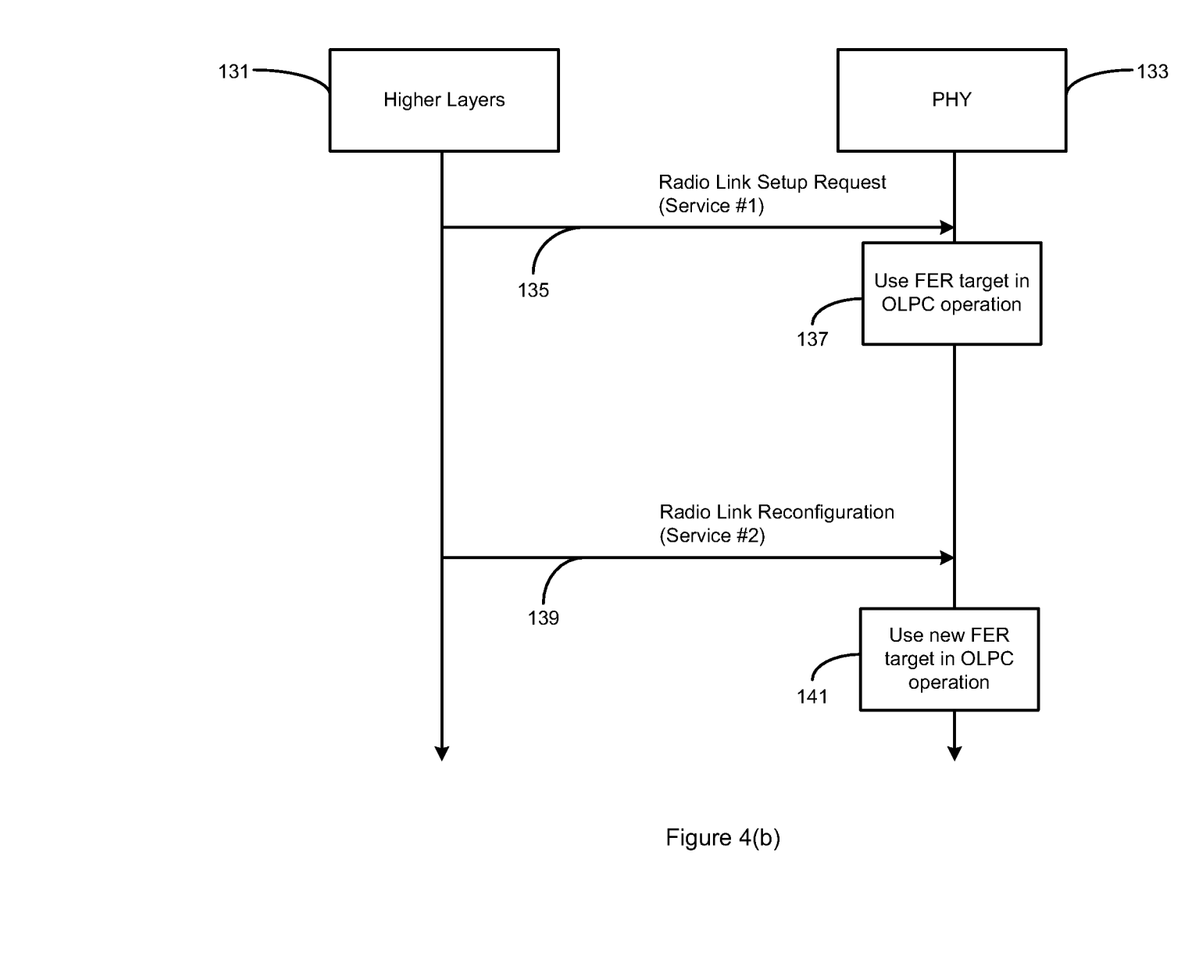

FIG. 4 illustrates the differences between the signalling in a conventional system (shown in FIG. 4(*a*)) and a system according to the invention (shown in FIG. 4(*b*)).

FIG. 4(*a*) shows the conventional signalling between the higher layers 101 (such as the Radio Resource Control layer and MAC layer) and the physical (PHY) layer 103. In particular, a Radio Link Setup request 105 for a first service (for example voice) is sent from the higher layers 101 to the physical layer 103. This request 105 includes an initial value for the first characteristic (i.e. the target SIR value) for the first service, and this is applied (step 107) by the physical layer 103 using an inner loop power control procedure.

Dashed box 109 indicates the outer loop power control procedure that takes place between the higher layers 101 and the physical layer 103. As described above, the outer loop power control procedure involves the periodic transmission (signal 111) of the new SIR target to the physical layer 103 using FP control frames. In step 113, this new SIR value is used by the inner loop power control procedure in the physical layer 103.

The outer loop power control procedure 109 continues until the radio link is discontinued (not shown) or where a Radio Link Reconfiguration request 115 is sent from the higher layers 101 to the physical layer 103, in order to change the service to a second service (for example data). Again, the Radio Link Reconfiguration request 115 includes an initial value for the first characteristic (i.e. the target SIR value) for the second service, and this is applied (step 117) by the physical layer using inner loop power control.

Dashed box 119 indicates the outer loop power control procedure that takes place between the higher layers 101 and the physical layer 103, in which a new SIR value is periodically transmitted (signal 121) to the physical layer 103 using FP control frames. In step 123, this new SIR value is used by the inner loop power control procedure in the physical layer 103.

Thus, in the WCDMA network referred to above, the CRC pass/fail indications (and a single TrCH BER value) will be carried with the user data out of the physical layer 103, through the MAC layer to the Radio Resource Control (RRC) layer 101. A "saw-tooth" algorithm can then be used in the RRC layer 101 with the resulting SIR target updates being signalled over the downlink user-plane connection into the physical layer 103 (signals 111 and 121), which typically occurs every 10-100 ms.

It will be appreciated that the uplink quality of service (and specifically the FER) required for a particular connection depends on the type of service being supported—for example speech or packet-switched data. In order to implement the outer loop power control procedure in the physical layer, the value of the quality of service criteria (i.e. the FER target) needs to be known within the physical layer of the femtocell device 6.

Thus, FIG. 4(b) shows the signalling between the higher layers 131 (such as the Radio Resource Control layer and MAC layer) and the physical (PHY) layer 133 in accordance with an aspect of the invention. In particular, a Radio Link Setup request 135 for a first service (for example voice) is sent from the higher layers 131 to the physical layer 133. This request 135 includes the value of the quality of service criteria (i.e. the Frame Error Rate—FER) for the first service, and this is used in the outer loop power control procedure (step 137) by the physical layer 133 to set the target SIR value.

The outer loop power control procedure 137 continues until the radio link is discontinued (not shown) or where a Radio Link Reconfiguration request 139 is sent from the higher layers 131 to the physical layer 133, in order to change the service to a second service (for example data). Again, the Radio Link Reconfiguration request 139 includes the value of the quality of service criteria (i.e. the FER value) for the second service, and this is used in the outer loop power control procedure (step 141) by the physical layer 133 to set a new target SIR value.

Thus, there are several advantages to including the outer loop power control procedure functionality in the physical layer of the femtocell device 6. Firstly, the latency in the loop is reduced in comparison with a conventional RNC-Node B system, allowing the system to react quicker to changing channel conditions. In particular, the new desired value for the first characteristic can be determined and provided to the inner loop within, typically, a single transmission time interval (TTI), which can be of the order of a few milliseconds (ms).

Secondly, the amount of FP control frame signalling that is required is reduced, as outer loop power control frames do not need to be sent from the radio resource control layer to the physical layer. This reduces the processing burden on higher layers and frees up more interface bandwidth for traffic.

Thirdly, the uplink SIR target can be calculated based on a wider range of physical layer parameters as described above, allowing for a more optimum uplink power setting and so reduced uplink interference.

Although the invention has been described in the form of a femtocell device, it will be appreciated that the invention can be embodied as a computer program or as suitably programmed hardware.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A femtocell device for use in connecting a mobile terminal to a communication network, the femtocell device comprising means for implementing a power control procedure in which a target value for a first characteristic of transmissions received from the mobile terminal is set and adjusted based on a quality of service criteria for the transmissions; and wherein the means for implementing the power control procedure operates in a physical layer of the femtocell device and the means for implementing the power control procedure operating in the physical layer of the femtocell device is adapted to received the quality of service criteria from a higher layer of the femtocell device.

2. A femtocell device as claimed in claim 1, wherein the means for implementing comprises a scheduler block that sets and adjusts the target value for the first characteristic in order for the transmissions received from the mobile terminal to satisfy the quality of service criteria.

3. A femtocell device as claimed in claim 2, wherein the scheduler block is adapted to determine whether the quality of service criteria is satisfied by measuring one or more quality of service parameters from the received transmissions.

4. A femtocell device as claimed in claim 3, wherein the scheduler block is adapted to adjust the target value for the first characteristic if the quality of service criteria is not satisfied.

5. A femtocell device as claimed in claim 2, wherein the scheduler block is further adapted to measure one or more characteristics of the uplink between the mobile terminal and the femtocell device.

6. A femtocell device as claimed in claim 5, wherein the scheduler block is adapted to measure one or more characteristics of one or more transport channels in the uplink.

7. A femtocell device as claimed in claim 6, wherein the scheduler block is adapted to measure a bit error rate of the one or more transport channels in the uplink.

8. A femtocell device as claimed in claim 5, wherein the scheduler block is adapted to measure one or more characteristics of a physical channel in the uplink.

9. A femtocell device as claimed in claim 8, wherein the scheduler block is adapted to measure a signal-to-interference ratio for the physical channel in the uplink.

10. A femtocell device as claimed in claim 5, wherein the scheduler block is adapted to use the measurements of the one or more characteristics of the uplink between the mobile terminal and the femtocell device to adjust the target value for the first characteristic of the transmissions received from the user equipment.

11. A femtocell device as claimed in claim 1, wherein the one or more quality of service parameters or quality of service criteria comprises a frame error rate, cyclic redundancy check pass/fail indication and/or transport channel bit error rate.

12. A femtocell device as claimed in claim 1, wherein the means for implementing further comprises a first processing block for measuring a value for the first characteristic from the received transmissions.

13. A femtocell device as claimed in claim 12, wherein the first processing block is further adapted to compare the measured value for the first characteristic with the target value, and to generate a power control signal from the result of the comparison for transmission to the mobile terminal.

14. A femtocell device as claimed in claim 13, wherein the power control signal is a Transmit Power Control signal.

15. A femtocell device as claimed in claim 1, wherein the first characteristic is a signal-to-interference ratio.

16. A femtocell device as claimed in claim 1, wherein the femtocell device is for connecting the mobile terminal to a WCDMA network.

17. A femtocell device as claimed in claim 1, wherein the femtocell device is for connecting the mobile terminal to a TD-SCDMA network.

18. A femtocell device as claimed in claim 1, wherein a higher layer in the femtocell device is adapted to provide the quality of service criteria to the physical layer.

19. A femtocell device as claimed in claim 18, wherein the higher layer is adapted to provide the quality of service criteria to the physical layer when a radio link between the user equipment and femtocell device is set up or reconfigured.

20. A femtocell device as claimed in claim 19, wherein the higher layer is adapted to include the quality of service criteria in a Radio Link Setup and/or Radio Link Reconfiguration signal sent to the physical layer.

21. A power control procedure for use in a femtocell device, the femtocell device being used to connect a mobile terminal to a communication network, the procedure comprising in a physical layer of the femtocell device, where the power control procedure operates, setting and adjusting a target value for a first characteristic of transmissions received from the mobile terminal based on a quality of service criteria for the transmissions, wherein the quality of service criteria is received from a higher layer in the femtocell device.

22. A communication device for use in connecting a mobile terminal to a communication network, the communication device comprising a femtocell configured to perform a power control procedure in which a target value for a first characteristic of transmissions received from the mobile terminal is set and adjusted based on a quality of service criteria for the transmissions and the power control procedure operates in a physical layer of the femtocell device, wherein the power control procedure operates in the physical layer of the femtocell device and is adapted to received the quality of service criteria from a higher layer of the femtocell device.

23. The device of claim 22, wherein the femtocell comprises an uplink chip-rate processing block, an uplink symbol-rate processing block and an uplink scheduler block.

\* \* \* \* \*